March 18, 1930. J. S. REID 1,751,171
LEAF SPRING STRUCTURE
Filed Sept. 7, 1926

Inventor
James S. Reid

By Brockett + Hyde
Attorneys

Patented Mar. 18, 1930

1,751,171

UNITED STATES PATENT OFFICE

JAMES S. REID, OF CLEVELAND, OHIO, ASSIGNOR TO THE NEWELL THOMPSON MANUFACTURING COMPANY, OF CLEVELAND, OHIO, A CORPORATION OF OHIO

LEAF-SPRING STRUCTURE

Application filed September 7, 1926. Serial No. 134,067.

This invention relates to improvement in leaf spring shock absorber structures for motor vehicles.

Heretofore, it has been the practice for the manufacturers of automobile shock absorbers of the type adapted for attachment to the vehicle springs to furnish with said absorbers, as separate attachments or accessories, a set of connecting members, adapted for association with the vehicle spring perch and to which members the shock absorbers might be attached. These connecting members have usually been short, non-resilient plate members provided with attaching lugs or ears and adapted for assembly with the vehicle springs by the usual U-bolts which connect the vehicle springs to the vehicle axles or spring perches.

The object of the present invention is to provide a spring and shock absorber mounting for vehicle springs wherein one of the movable elements of the shock absorber is attached directly to the lower-most or shortest leaf of the spring rather than to the spring perch so that the shock absorbing stress and strain is brought to bear upon a portion of the spring removed from the spring perch. All of the normal grief to which vehicle springs are subjected is effective at the perch and most of the breakage occurs along the line of the bolt at the center holding the leaves together. The addition of the shock absorbing stress at this point adds unnecessary grief and is readily overcome by the foregoing arrangement.

Further objects of the invention are in part obvious and in part will appear more in detail hereinafter.

Figure 1:
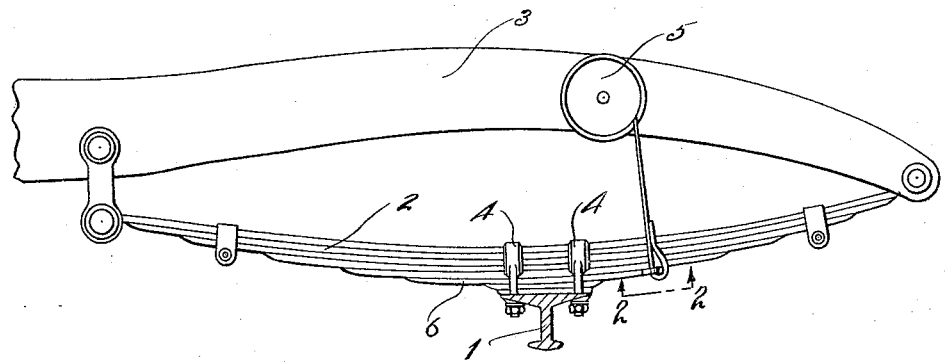
Figure 2:
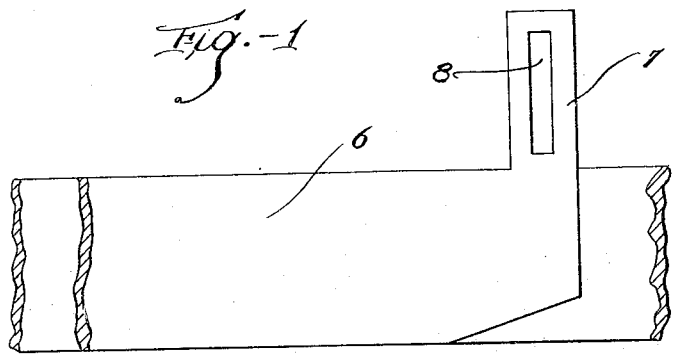
Figure 3:
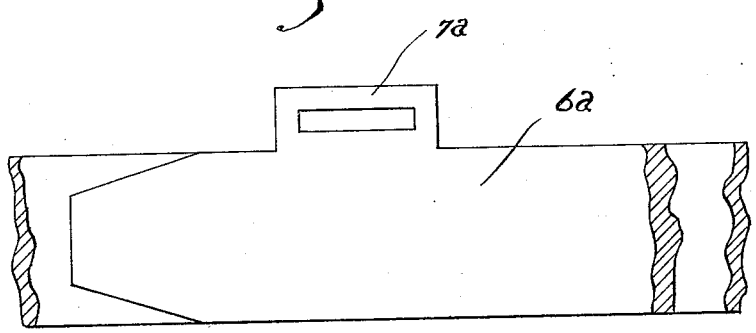

In the drawing, which represents one suitable embodiment of the invention, Fig. 1 is a side elevation of the front end of a vehicle frame, with a shock absorber and my improved leaf spring structure associated therewith; Fig. 2 is a detail bottom plan view of a portion of said spring structure, taken on the line 2—2, Fig. 1; and Fig. 3 is a view similar to Fig. 2 and showing a slight modification.

Referring to the drawing, 1 represents the front axle having a spring perch 1', upon which is mounted, through the medium of my improved leaf spring structure 2, the running gear frame 3 of the vehicle, said spring structure being secured to the frame in the usual way and being secured to the spring perch by the usual U-bolts 4. 5 represents a suitable shock absorber of the type adapted to be mounted upon the vehicle frame 3 and to be connected to the vehicle spring structure 2.

Heretofore, it has been the practice for manufacturers of shock absorbers of this type to furnish threwith, as separate attachments or accessories, a set of connecting members which were adapted to be associated with the vehicle spring structures and to have attached thereto the shock absorbers. These connecting members have usually been short, non-resilient plate members provided with attaching lugs or eyes and adapted for assembly with the vehicle spring structures by the U-bolts which connect the spring structures to the vehicle axles.

The improved leaf spring structure 2 of the present application comprises a plurality of resilient leaf members, as is usual, but preferably the lower-most one of said resilient leaf members is provided with a laterally extending, integral lug to which the shock absorber 5 may be connected. In the present illustration, the lower-most and shorter leaf member 6 is provided with the attaching lug 7. Preferably, said lug is provided with an aperture 8, which may or may not be elongated, as shown.

The attaching lug 7 of Fig. 2 is of rectangular shape, with the longitudinal axis thereof extending normal to the longitudinal axis of the leaf member 6, while in Fig. 3, the attaching lug $7^a$ is of rectangular shape, as before, but the longitudinal axis thereof is parallel with the longitudinal axis of the leaf member $6^a$ of which it forms an integral part.

In the manufacture of the present leaf spring structure, one of the resilient leaf members will be formed with such a laterally extending, integral lug, so that if the manufacturer or the owner of a vehicle provided with the present improved spring structures wishes to install on said vehicle shock absorbers of this type, he will find the spring structures already provided with lugs to which said shock absorbers may be easily and quickly attached.

What I claim is:

1. A spring and shock absorber mounting for a vehicle, comprising a shock absorber for attachment to the vehicle frame and having a movable actuating part, and a spring comprising a plurality of superposed leaves of various lengths with spaced members connecting said leaves and a lug secured to one of the lower-most leaves near the end thereof and spaced from said connecting members and attached to the actuating part of the shock absorber.

2. A spring and shock absorber mounting for a vehicle as in claim 1 wherein the lug is integral with the lower-most spring leaf and projects laterally therefrom.

In testimony whereof I hereby affix my signature.

JAMES S. REID.